United States Patent Office 2,762,815
Patented Sept. 11, 1956

2,762,815

3-ISOXAZOLIDONES, DERIVATIVES AND PROCESS

Albert Pohland, Indianapolis, Ind., assignor to Commercial Solvents Corporation, a corporation of Maryland No Drawing. Application April 6, 1955,
Serial No. 499,764

4 Claims. (Cl. 260—307)

This invention relates to novel cyclic compounds and to the preparation thereof.

The novel compounds of this invention are represented by the following formula:

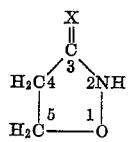

in which X represents O or NH.

When X represents O the compound is denominated 3-isoxazolidone, and when X represents NH, the compound is denominated 3-iminoisoxazolidine.

The compounds have useful antibacterial properties, especially against mycobacteria. Moreover, they can be employed as starting materials for the production of other compounds having useful antibacterial properties.

The compounds are readily prepared by cyclization processes, the cyclization of an ester of 3-aminoxypropionic acid yielding 3-isoxazolidone, and the cyclization of 3-aminoxypropionitrile or its N-isopropylidene derivative or other like derivative yielding 3-iminoisoxazolidne.

This invention is further illustrated by the following specific examples:

EXAMPLE 1

*Preparation of 3-iminoisoxazolidine*

25 g. of 3-(isopropylideneaminoxy)-propionitrile [prepared according to the procedure of Bruson, J. Am. Chem. Soc. 65, 23 (1943)] and 50 ml. of 5 N hydrochloric acid are mixed, and the mixture is heated with stirring to about 50° C. for about 4 hours. The reaction mixture is cooled, is extracted with two 50-ml. portions of ether to remove any small amount of unreacted starting material, and the ether extracts are discarded. The extracted aqueous material is evaporated to dryness in vacuo yielding an oily residue of 3-iminoisoxazolidine hydrochloride. The oily residue is dissolved in 50 ml. of water, 17.8 g. of sodium bicarbonate are added to the solution, and the soluton is again evaporated to dryness in vacuo. The solid residue consisting of a mixture of sodium chloride, sodium bicarbonate, and 3-iminoisoxazolidine is warmed with 50 ml. of ethanol. The 3-iminoisoxazolidine dissolves in the alcohol leaving the sodium salts as a residue. The alcoholic solution is filtered, ether is added in an amount sufficient to produce incipient precipitation of the 3-iminoisoxazolidine, and the mixture is cooled in a refrigerator. The heavy needles of 3-iminoisoxazolidine which separate are further purified by recrystallization from alcohol-ether mixture. The purified material melts at about 102–104° C.

Analysis.—Calculated for $C_3H_6N_2O$: C, 41.85; H, 7.02; N, 32.54. Found C, 41.90; H, 7.12; N, 32.61.

Instead of the hydrochloric acid used in the above example, other mineral acids can be employed for the cyclization of the aminoxypropionitrile, or its equivalents, for example, the isopropylidene derivative described above. Suitable acids include, for example, sulfuric acid, phosphoric acid, trichloracetic acid, and the like.

EXAMPLE 2

*Preparation of 3-isoxazolidone*

A mixture of 100.8 g. of 3-(isopropylideneaminoxy) propionitrile and 200 ml. of 5 N hydrochloric acid are placed in a 500 ml. 3-neck flask fitted with a stirrer, dropping funnel and distillation condenser. The reaction mixture is stirred and heated to slow distillation temperature for about 8 hours, allowing the acetone and water to distill and at the same time adding sufficient water from time to time to maintain the original reaction volume. The reaction mixture is then evaporated in vacuo to dryness, yielding a solid residue of 3-aminopropionic acid hydrochloride. The acid salt is purified by recrystallizing it twice from a mixture of ethanol and ether. The purified compound melts at about 150–151° C.

Analysis.—Calculated for $C_3H_7NO_3 \cdot HCl$: C, 25.45; H, 5.69; N, 9.90; Cl 25.05. Found: C, 25.29; H, 5.65; N, 9.98; Cl, 24.95.

25 g. of 3-aminoxypropionic acid hydrochloride are dissolved in 150 ml. of ethanol, and the solution is saturated with hydrogen chloride gas. The solution is allowed to stand overnight at room temperature, and the ethanol is removed in vacuo, yielding ethyl 3-aminoxypropionate hydrochloride. The hydrochloride is dissolved in 100 ml. of water and excess dry sodium carbonate is added to liberate the free ester base. The ethyl 3-aminoxypropionate which separates is extracted with either. The ether extract is dried over magnesium sulfate, and the dry solution is fractionally distilled in vacuo. The ester boils at about 87° C. at a pressure of about 10 mm. of mercury. The refractive index is as follows: $n_D^{25} = 1.4328$.

Analysis.—Calculated for $C_5H_{11}NO_3$: C, 45.10; H, 8.33; N, 10.52. Found: C, 45.42; H, 8.43; N, 10.54.

6.7 g. of ethyl β-aminoxypropionate are dissolved in a solution of 3.4 g. of potassium hydroxide in 25 ml. of ethanol. The mixture is allowed to stand at room temperature for 48 hours during which time the ester cyclizes to 3-isoxazolidone. About 225 ml. of ether are added to the reaction mixture, causing precipitation of the potassium salt of 3-isoxazolidone in solid form. The solid is filtered off and dried in vacuo. The potassium salt of 3-isoxazolidone is a white hygroscopic powder.

Instead of the ethyl ester used above, other esters of 3-aminoxypropionic acid can be employed. Likewise, other strong alkalies can be employed to effect the cyclization.

Analysis.—Calculated for $C_3H_4NO_2K$: C, 28.80; H, 3.20; N, 11.20. Found: C, 27.56; H, 3.59; N, 10.56.

2 g. of the potassium salt of 3-isoxazodidone are dissolved in 75 ml. of water and the solution is passed over a column of "Amberlite" IR 120 in its acid form, the dimensions of the column being ½ by 14 inches. The eluate is collected and is evaporated to dryness in vacuo, leaving a residue of 3-isoxazolidone. The residue is recrystallized from a mixture of ethyl acetate and petroleum ether. The purified 3-isoxazolidone melts at about 68–69° C.

1.2 g. of ethyl 3-aminoxypropionate dissolved in 50 ml. of 0.2 N sodium hydroxide is allowed to stand at room temperature for about twelve hours during which time the ester cyclizes to 3-isoxazolidone. To the mixture is added a mixture of 10 ml. of 1 N acetic acid and 10 ml. of 1 N silver nitrate, whereupon the silver salt of 3-isoxazolidone precipitates as a white solid. The solid salt is dried by heating it to about 70° C. in vacuo.

Analysis.—Calculated for $C_3H_4NO_2Ag$: C, 18.6; H, 2.06. Found: C, 18.47; H, 2.17.

The silver salt is converted to the free 3-isoxazolidone by treating an aqueous suspension of the salt with an equivalent amount of dilute hydrochloric acid, filtering off the precipitate of silver chloride, and evaporating the aqueous solution of 3-isoxazolidone to dryness in vacuo.

I claim:

1. A compound represented by the following formula:

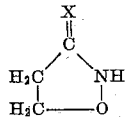

in which X represents a member of the group consisting of O and NH.

2. A compound represented by the following formula:

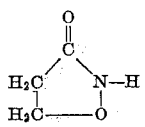

3. A compound represented by the following formula:

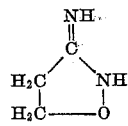

4. A method of preparing a compound represented by the following formula:

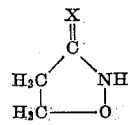

in which X is selected from the group consisting of O and NH, which comprises cyclizing a compound selected from the group consisting of 3-aminoxypropionitrile and an ester of 3-aminoxypropionic acid.

No references cited.